July 28, 1959
J. ROSENBERG
2,896,514
CONTROL SYSTEM
Filed Jan. 24, 1957
3 Sheets-Sheet 1
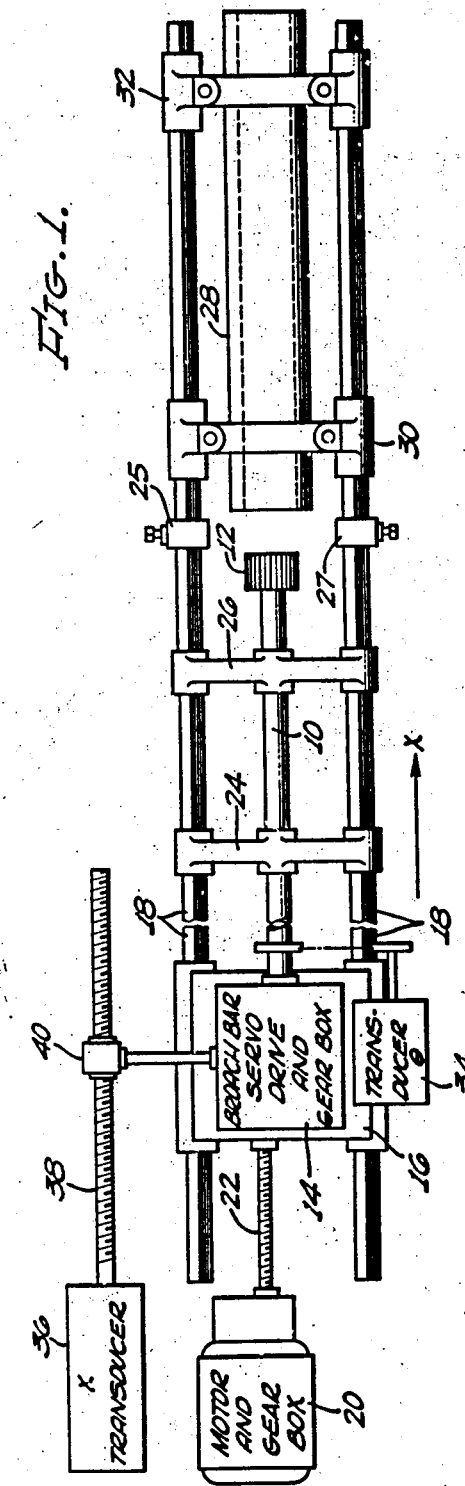
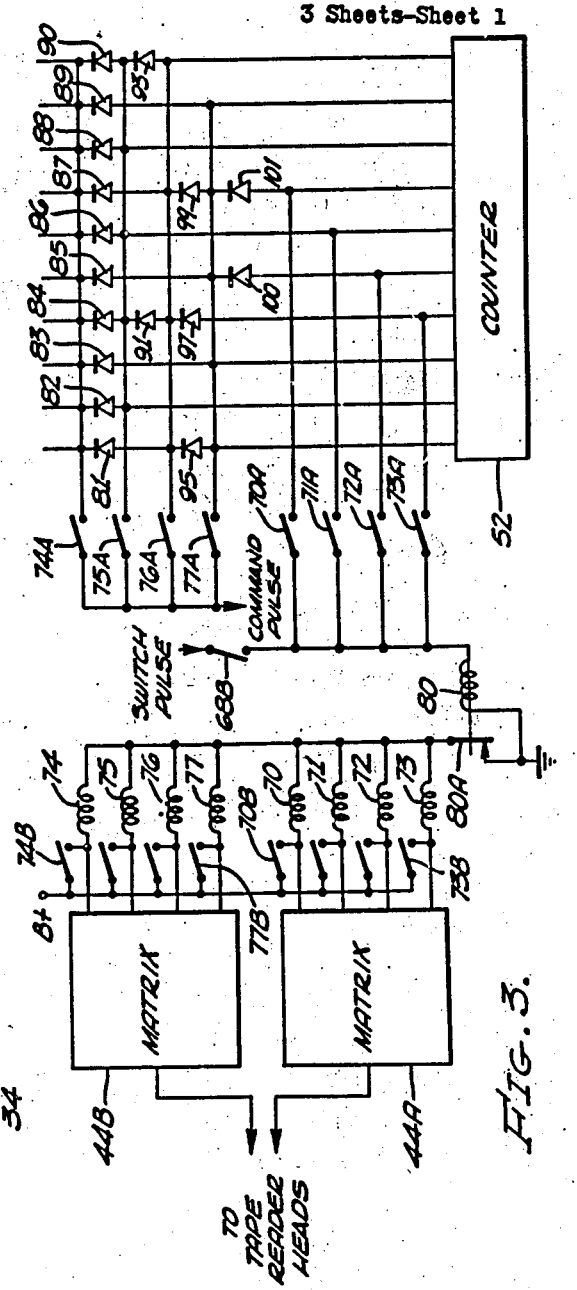
JACK ROSENBERG
INVENTOR.
BY *J. L. Bowes*
ATTORNEY

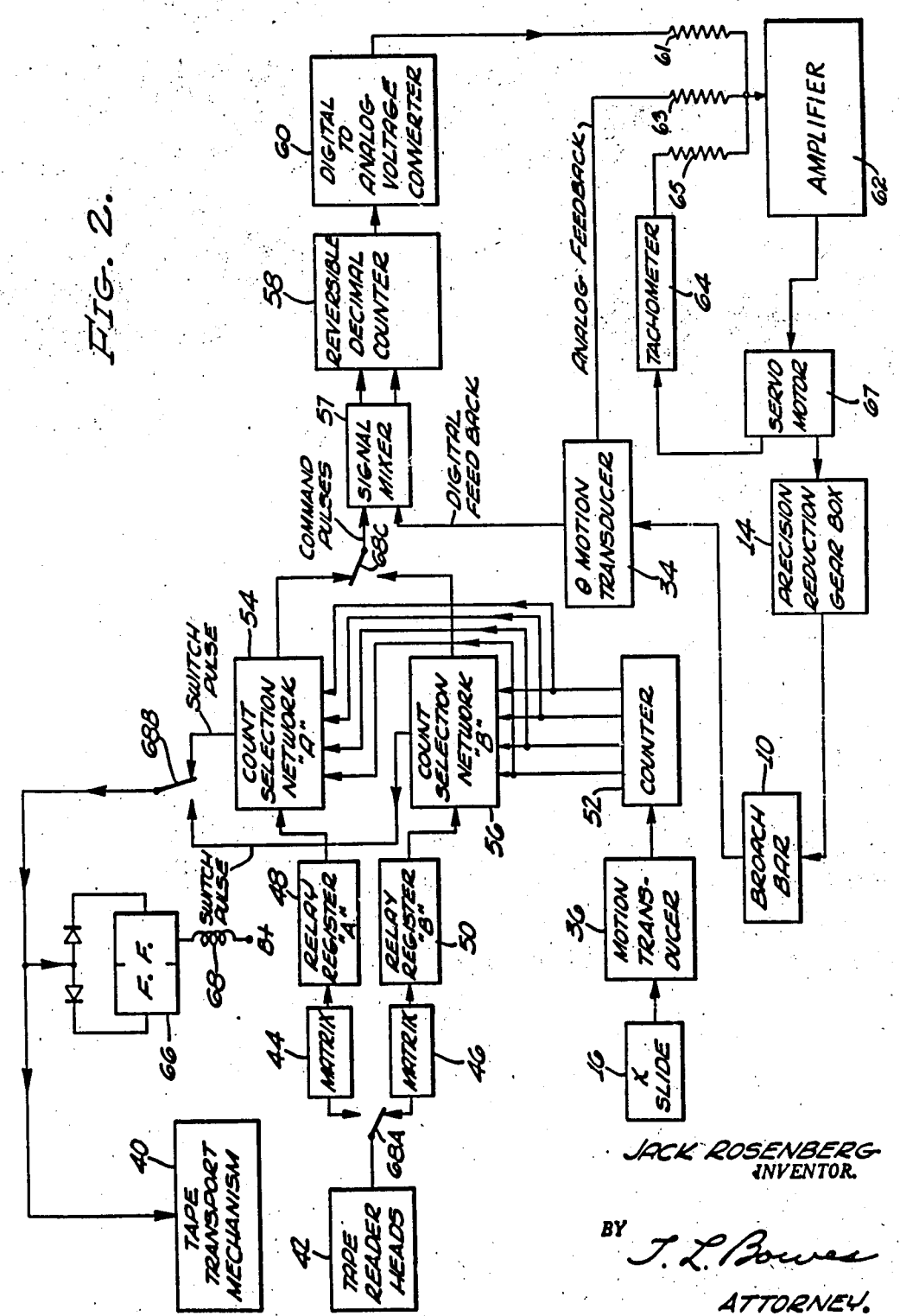

July 28, 1959

J. ROSENBERG 2,896,514

CONTROL SYSTEM

Filed Jan. 24, 1957

INVENTOR.
JACK ROSENBERG
BY J. L. Bowes
ATTORNEY

United States Patent Office 2,896,514
Patented July 28, 1959

2,896,514

CONTROL SYSTEM

Jack Rosenberg, Pacific Palisades, Calif., assignor to General Dynamics Corporation, Rochester, N.Y., a corporation of Delaware Application January 24, 1957, Serial No. 636,089

7 Claims. (Cl. 90—28.1)

This invention relates to gun barrel rifling apparatus and, more particularly, to improvements therein.

The present method for rifling the barrels of a large-sized gun or cannon is to clamp the barrel so that it does not move and thereafter insert a broach which is moved both linearly and rotatably through the cannon bore to cut a groove therein having a desired helical configuration. To insure the correctness of the helix, the broach is mounted on a broach bar. The broach bar is preliminarily cut with a helical groove having the desired characteristics. A follower pin is inserted in this groove, and the broach bar is moved into the gun barrel in a manner so that the stationary follower pin causes the broach bar to be rotated in accordance with the helical path cut into the bar.

It will therefore be appreciated that in rifling a gun barrel, first the broach bar must be prepared and, thereafter, the actual rifling operation can take place within the barrel of the gun. For different helices, a different broach bar must be prepared. This requires a stock of broach bars to be kept. The system is rather inflexible. To preserve accuracy, care must be taken to see that these broach bars are replaced before the grooves become sufficiently worn to provide inaccurate following.

It is an object of this invention to eliminate the requirement for cutting a helix in a broach bar prior to rifling a gun barrel.

It is a further ofject of this invention to enable the more rapid rifling of a gun barrel.

It is still a further object of this invention to provide a novel and useful control system for apparatus for rifling a gun barrel.

Still a further object of this invention is to provide a flexible system for rifling a gun barrel.

Yet another object of the present invention is the provision of an electronic control system for the rifling of a gun barrel which reduces the cost of apparatus used for this purpose.

These and other objects of the invention are achieved in a system whereby a desired helix in a gun barrel is represented by a plurality of first and associated second numbers. Each first number represents the amount of rotation of a broach required during its predetermined linear movement through the gun barrel, represented by the associated second number. Each set of two numbers is successively converted by electronic apparatus into instructions for rotating the broach as it moves linearly through the gun tube. Effectively, the data recorded defines the rotary position of the broach as a function of its linear displacement. This invention includes means for reading the recorded information successively, a linear-motion transducer for generating pulses as the broach bar is advanced linearly, and means for deriving a specified number of command pulses from those generated by the linear motion transducer as determined by a first number which has been read. A rotary-motion transducer is employed for producing pulses indicative of the extent of rotation of the broach.

Means are provided for comparing the output of the rotary transducer with the number of command pulses and the broach is rotated responsive to the error signal or the difference. When the number of pulses provided by the linear-motion transducer equals the second number associated with the first number used in obtaining the command pulses, a new set of first and second numbers is read out.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a diagrammatic view of the apparatus in accordance with this invention;

Figure 2 is a block diagram of the electronic system which is an embodiment of this invention;

Figure 3 is a block schematic diagram showing one arrangement for pulse selection from a counter output which may be employed in the embodiment of this invention.

Figure 4:
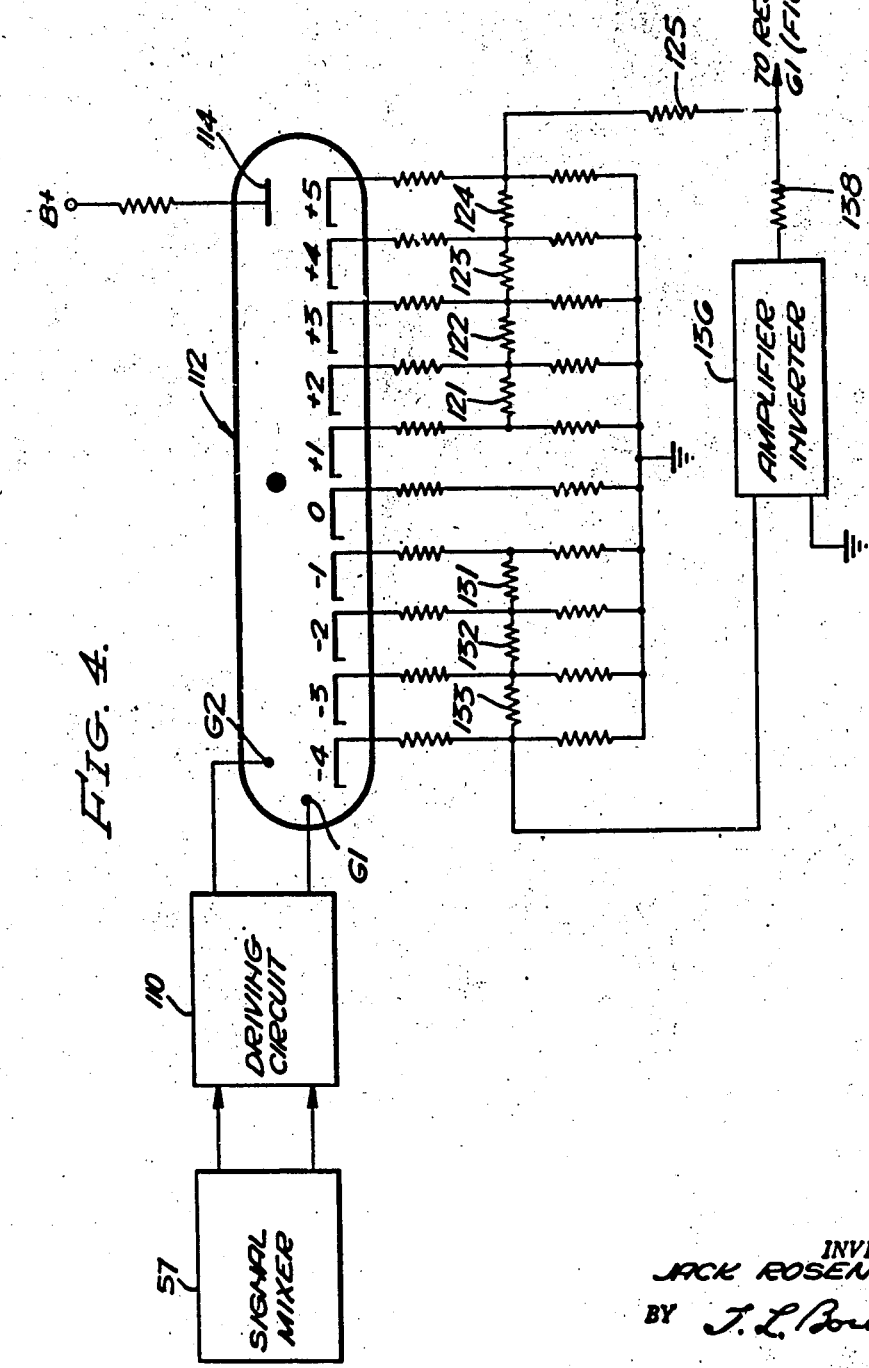
Figure 4 is a schematic drawing of an arrangement for a combined reversible decimal counter and digital-to-analog voltage converter.

The control function of the rotary motion of a rifling bar may be described by the following equation:

$$\theta = f(x, y)$$

where $\theta$ is the angular displacement of the rifling bar with respect to a fixed reference, $x$ is the longitudinal position of the slide of the rifling machine, and $y$ is a quantity which describes the pitch of the helix and varies in the case of nonlinear helices. Since, in the rifling machine the angular position $\theta$ of the rifling bar must be determined and reproduced very accurately for all positions of the slide, defined as the function $x$, one solution which can be employed is to permit $x$ to be the independent variable and $\theta$ to be synchronized or slaved thereto as a dependent function. There are two other solutions, but these are not desirable because of the complexity and amount of equipment which would be required with them.

The system where $x$ is the independent variable and $\theta$ the dependent variable requires apparatus for controlling $\theta$ as $x$ varies. In the prior-art rifling systems, $\theta$ was controlled by using a stationary follower pin which was inserted in the groove of the helix cut on the broach ing bar. The broaching bar is moved into the gun barrel and is forced to rotate by operation of the follower pin in the groove. Referring to Figure 1, which is a diagram of an embodiment of this invention, the broaching bar 10, which carries the broach 12, is rotated by operation of a broach bar drive and gear box 14. This is mounted on the slide 16. This slide is driven along the ways 18 by a motor and gear box 20 and a longitudinal drive screw 22, which engages a threaded portion (not shown) of the slide 16. Moving pillow blocks 24, 26 support the broaching bar and move therewith until stops 25, 27 are reached, at which point they are held against further motion toward the gun tube while the broach bar continues to be driven into the gun barrel. The gun tube 28 is mounted in fixed pillow blocks 30, 32.

A motion transducer 34, indicated as the $\theta$ transducer, is driven together with the broach bar. This $\theta$ transducer produces a pulse output for every increment of rotational motion through which the broach bar rotates. An $x$ motion transducer 36 is driven from a screw 38, which in turn is driven from a ball-bearing split nut 40, which in turn is moved whenever the slide 16 is moved. Thus, motion of the slide rotates the screw 38, which in turn enables the $x$ transducer 36 to produce as an output a pulse for every increment of linear motion through which the slide and the broach bar 10 and the broach 12 move.

In operation, electrical apparatus shown in Figure 2 serves the function of deriving a number of command pulses from the output of the $x$ transducer, from which are subtracted the number of pulses provided by the output of the $\theta$ transducer. The difference is applied to the broach bar drive and gear box to rotate the broach bar. First, the slide 16 is driven forward to a starting position with the broach 12 just at the point where the gun barrel should begin. This is done for the purpose of eliminating any backlash in the driving apparatus. Thereafter, the pulses from the $x$ transducer are multiplied by a factor in accordance with the desired extent of rotation of the broach relative to the linear motion of the broach. The broach bar drive and gear box is then energized by these derived pulses as the motor and gear box 20 continues to drive the slide 16 closer to the gun tube 28.

The equation which defines the shape of the desired helix is evaluated at a sufficient number of points on the $x$ axis and the corresponding values of $\theta$ are derived therefrom to insure that an acceptable rifling curve with linear interpolations between these points can be performed. It is then seen what displacements of $\theta$ are required. The value of $x$ for each point can be assigned a number which represents a linear distance or the number of pulses to be derived from the $x$ transducer commencing with the starting position of the slide. The $\theta$ displacement number may be said to represent the number of increments of rotational motion required from a starting position to provide the desired helical cut along that linear distance within the gun tube. These numbers are entered successively in a recording medium such as magnetic tape or, preferably, paper tape.

Referring now to Figure 2, which is a block circuit diagram of the invention, the tape transport mechanism 40 is of the well-known commercially purchasable type which moves a desired distance in response to an input pulse or signal. Tape reading heads 42 are provided which, for punched paper tape, may have feeler pins which sense the presence or absence of the holes representing the first and second numbers stored on the tape. The tape reading heads will read these numbers and enter them successively in response to command pulses into a matrix. This matrix decodes the number and energizes a relay in a relay register corresponding to the decoded number. In the embodiment of the invention shown in Figure 2, two matrices 44, 46 and corresponding relay registers 48, 50 are employed in order to assure an absolute smoothness in transition in the operation of the apparatus. The electrical apparatus is not permitted to wait while a number is read out of the tape after the completion of the operation dictated by the previous numbers read. One register is filled while operations are being performed with the contents of the other register. Accordingly, referring back to Figure 2, the outputs of the tape reading heads 42 will go through relay contacts 68A to either a first matrix 44 or a second matrix 46. These matrices are identical. The outputs of these matrices are respectively applied to relay register 48 and relay register 50. The decoded numbers which are read from the tape reader heads will energize two relays in a relay register. One of these relays corresponds to a first number and the other of these corresponds to the associated second number.

The slide 16 is labeled in Figure 2 as the $x$ slide. The $x$ motion transducer 36 produces pulses as the $x$ slide moves along the ways. These pulses are applied to a counter 52.

Consider now that two numbers have been entered into relay register 48. The second of these represents the desired distance $x$, within which the broach is to rotate an amount indicated by the first number. This first number may be termed a multiplying factor. Counter 52 proceeds to count the pulses from the motion transducer 36. The first number is employed to select pulse outputs from the counter at various counts in a manner as shown in Figure 3. The relay register 48 operates a count-selection network 54 and the relay register 50 operates its associated count-selection network 56. Count-selection network 54 selects counter output pulses as the counter progresses, which are applied to a signal mixer 57. These counter pulses are known as command pulses. The function of the signal mixer 57 will become clear as this explanation proceeds.

The output of the signal mixer will be pulses which are applied to a reversible decimal counter 58. The count in this reversible decimal counter is the difference derived by subtracting from the number of command pulses the number of pulses generated by the $\theta$ motion transducer 34, which is driven from the broach bar apparatus 14. The purpose of the signal mixer 57 is to enter pulses received with the proper sign into the reversible counter and to prevent errors which may occur when both command pulses and $\theta$ motion transducer pulses are received substantially simultaneously. Since the broach bar is not driven until a command pulse is applied through intervening apparatus to its drive motor, the output of the $\theta$ motion transducer is indicative of the response to the command pulse. The output of the reversible decimal counter 58 is applied to a digital-to-analog voltage converter 60, the output from which is applied to a voltage-adding network including resistors 61, 63, and 65. The digital-to-analog voltage converter output is applied to resistor 61. An analog feedback voltage from the $\theta$ motion transducer is applied to a resistor 63. An output voltage from the tachometer is applied to resistor 65. The resistor network adds these signals to provide interpolation between digit generating points and velocity stabilization of two-phase, 60-cycle servo-motor, or other actuator, 67 which is driven by an amplifier 62, which amplifies the output of the three-resistor network.

The signal mixer 57, reversible decimal counter 58, and digital-to-analog voltage converter are all well-known apparatus employed in digital servo loops. The counter 52 also constitutes well-known circuitry. A preferred arrangement for the counter is described and claimed in an application for an Electronic Counter, by Thomas J. Scuitto, filed August 22, 1956, Serial No. 605,564, now Patent No. 2,871,399, and assigned to a common assignee. The signal mixer 57 is described and claimed in an application for a Control Circuit, by Norman L. Olson, filed November 23, 1956, Serial No. 623,937, now Patent No. 2,867,724, and assigned to a common assignee. A preferred arrangement for the reversible decimal counter and digital-to-analog voltage converter is described and claimed in an application to Jack Rosenberg et al., entitled Reversible Decimal Counter, filed December 28, 1956, Serial No. 631,336, and assigned to a common assignee. A preferred arrangement for the amplifier 62 and the analog feedback from the $\theta$ motion transducer is described and claimed in an application by Walter B. Broadwell for an Anti-Hunting System, filed August 22, 1956, Serial No. 605,619, and assigned to a common assignee.

The apparatus included between the signal mixer 57 and the $\theta$ motion transducer 34 forms a servoloop which functions in an incremental manner with command pulses being fed thereto after they are derived from the operation of the $x$ slide. At any time the quantity in the reversible counter 58 represents the difference between commanded and actual rotary position of the rifling bar. This difference is continuously converted into a voltage which is linearly proportional to the digital difference which is then compensated and fed as an error signal to the fast-acting 60-cycle magnetic amplifier.

When the counter 52 counts to a value indicated by the first number stored in relay register 48, an output pulse is derived from the counter by the count-selection network 54 and is applied to a flip-flop circuit 66. This flip-flop circuit is coupled to be successively driven from one to the other of its stable states in response to input pulses in a manner shown by I. E. Grossdoff in the article entitled "Electronic Counters" in the RCA Review for September 1946. In response to this input pulse, the flip-flop energizes a relay 68, which has three sets of contacts 68A, 68B, and 68C. Contacts 68C switch the input to the signal mixer from count-selection network 54 to count-selection network 56, so that the counts of the counter 52, which are thereafter selected, are determined by the number stored in relay register 50.

Contacts 68A transfer the output of the tape-reader heads from the matrix 46 to the matrix 44, where the output of the tape reader heads will be entered into relay register A while the information in relay register B is being processed. Contacts 68B are also switched to apply an output pulse from count-selection network 56 to the flip-flop 66 and to the tape transport when the counter 52 has counted up to the second number which is in relay register 50. This occurs when the number of pulses from the $x$ motion transducer equals the second number value. At this time, the flip-flop 66 is reset and relay 68 is de-energized, whereby its contacts 68A, B, C will assume the position shown in the drawing.

To begin the operation of this invention, first, the $x$ slide is held stationary. A first and second number are entered from the tape reader heads into relay register 48. The tape transport is then actuated and the next first and second number are entered into the relay register 50. The motor and gear box 20, which drives the slide 16, is then started. Output from the motion transducer 36 is prevented from entering the counter until the $x$ slide 16 reaches a predetermined starting position. This can be sensed by a suitably positioned microswitch (not shown). The pulse output of the motion transducer 36 is then connected to the counter 52. Command pulses are entered into the signal mixer from count-selection network A. When the total number of $x$ motion pulse indicated by the second number has been counted, this coincidence is recognized by the recognition-gate portion of the count-selection network, which then applies an output pulse to flip-flop 66, which energizes relay 68. The recognition-gate output pulse is applied also to the tape transport mechanism 40 to command it to move to the next set of numbers which are read by tape reader 42 into relay register A. Meanwhile, the $x$ slide continues moving and count-selection occurs in accordance with the set of numbers in relay register B. When these are satisfied, the flip-flop 66 is reset and the operation of the system can then occur in accordance with the data which has been entered into relay register A. At this time, the tape-transport mechanism moves so that a new set of numbers may be entered into relay register B. The system thus continues to operate automatically until the helix has been completely cut in the gun bore.

Referring now to Figure 3, there is shown in more detail the manner of count-selection and count-recognition of the selection networks in response to operation of the relay registers. By way of example and to maintain simplicity in the drawings, a counter is shown having ten outputs, activated in sequence by the ten count states. A single-relay register is shown, representative of either register 48 or 50, which consists of two sets of four relays. One set performs the count-selection function, the other set the count-recognition function. It will be understood that the above number of relays and count states are by way of illustration only and are employed to simplify the explanation. These are not to be construed as a limitation on the invention, since the size of the counter and the size of the relay register may be varied as is required.

Furthermore, as is well known, the relay functions may also be performed by suitable electronic components.

The tape-read heads 42 may be, as previously described, feeler pins. Two sets of these are required for reading the first and second numbers. The first number enters a diode matrix 44A; the second number enters a diode matrix 44B. These matrices are well known, one arrangement being described and shown, for example, in the book High-Speed Computing Devices, by Engineering Research Associates, published by the McGraw-Hill Book Company, Inc., in 1950, on pages 40 et seq. thereof. These matrices serve the function of taking the binary information provided by the tape and converting it to decimal information of the type where one of ten lines is energized, depending upon the decimal value of the binary input to the matrix. The energized line, which comprises the output of the matrix 44A, causes one of the relays in the group 70 through 73 to be operated, thereby closing one of the contacts 70A through 73A, and also closing one of the self-locking contacts 70B through 73B. The one of the excited lines that comprises the output of matrix 44B will cause one of the relays 74—77 to be operated, thereby closing one of the contacts 74A—77A, as well as one of the self-locking contacts 74B—77B to be operated.

The output of the counter 52 has every one of its counting state outputs respectively connected to the contacts 74A through diodes 81—90. Therefore, if relay 74 is operated, a command-pulse output to the succeeding signal mixer would occur every time the counter counted. This would be representative of the desire to have the broach rotate an increment of arc with every increment of linear motion indicated by the output of the motion transducer 36. Contacts 75A are connected to derive an output for every third output pulse from the linear motion transducer. Diodes 91 and 93 are in series with the second and last counts selected by these contacts. Contacts 76A select counts 1, 4, 7, and 10 through diodes 95, 97, and 99. Contacts 77A select counts 1, 3, 5, 7, and 9 through diodes 100 and 101. The diodes 81—101 are connected to provide isolation between count outputs of the counter by blocking paths of output pulses which can cause a false count indication. It will thus be seen that the number which is entered into the relay register multiplies by a decimal value less than or equal to one the output of the $x$ motion transducer. In this way, the rotational motion of the broach relative to the linear motion of the slide may be controlled and varied as desired.

The second number, which is indicative of the extent of linear motion within which the rotational motion is to occur, causes the operation of one of the relays 70—73. This will close one of the contacts 70A—73A. It will be noted that these contacts are also connected to the output of the counter, but instead of being connected to a multiplicity of these outputs are connected to only one of the counter outputs. The point to which they are connected establishes the end of the $x$ motion represented by this number. At that time, the counter output is applied as a switch pulse to the flip-flop 66 and to the tape-transport mechanism. This output pulse is also applied to a relay 80 which has normally closed contact 80A. All the relay coils 70—77 are connected to ground through contacts 80A. These contacts are momentarily opened by the selected count pulse, thus rendering all relays inoperative. This causes any of the self-locking contacts 70B—77B, which were closed to hold a relay operative, to be opened, thus enabling the register to store the next number to be received from the tape.

From the above, it may be seen that each register includes a count selection portion, operative responsive to a first number and a count-recognition portion operative responsive to a second number. Actually, these are all recognition circuits whose functions can be performed electronically by the use of coincidence or recognition gates actuated responsive to the diode matrix and the counter. Furthermore, it is quite possible to extend the operation of the system by closing the relay contacts, responsive to numbers read, in various combinations. This enables a greater count selection using fewer relays. Thus relay 74 may be eliminated or used for other count selections if relays 75 and 77 are operated instead.

In the embodiment of the invention described above, two numbers are required for establishing the rotational cut along a given distance of the linear axis. Another embodiment of the invention may be employed wherein only one number is required to be stored. This can be used to obviate the second number, or the one indicative of the lineal distance. This also removes the necessity for the second number matrix and the portion of the relay register and count-selection network associated therewith. The above may be accomplished by selecting a fixed lineal distance increment along the x axis and recording only the number representing the extent of rotation of the broach bar required within this fixed-lineal distance. Whenever the counter 52 has counted a number of pulses indicative of the fact that this fixed distance has been traversed, it provides an output which causes the tape transport to move and provide the next number which indicates the desired rotation for the broach bar within the next lineal increment. Two registers are employed to insure continuous operation of the apparatus.

The number of points selected for control in the two-number system may be determined on the basis of the amount of interpolation desired to be performed. Alternatively, the apparatus can be designed to provide linear or second-order interpolation by altering the number of pulses received from the x motion transducer and the θ motion transducer, and also by altering the count tapoff points in the count-selection networks. The motion transducers are well-known and commercially purchasable devices which operate on the principle of a transformer having one of its windings movable with respect to the other.

Figure 4 is a diagram of an illustrative combined reversible counter and analog-to-digital voltage converter. The signal mixer 57 applies its output to a driving circuit 110. The driving circuit provides as output two pulses on its two output terminals 110A and 110B. The order in which these occur determines whether the reversible counter 112 increases its count indication by one or decreases its count indication by one. The counter 112 comprises one or more glow-switching tubes of a type which are sold commercially as either Dekatrons or, for example, by Sylvania Electric Products, Inc., under the tube indication type 6476. The tube is also sold by the Atomic Instrument Company of Cambridge, Massachusetts and designated as the GS10C. Briefly described, the tube has a common anode about which are disposed 30 cathodes. Ten of these are called main cathodes; the remainder are called guide cathodes and are classed as first and second guide cathodes. Between each two main cathodes are a first and second guide cathode. The disposition can be considered as main cathode, first guide, second guide, main cathode, etc., around the circle of the cathodes. The tube operates on the principle that the ionization or starting voltage of gas-filled tubes is lower if ions or electrons are already present in the anode-cathode gap. Under these conditions, a glow discharge can be made to move from one cathode to an adjacent one by means of a relatively small negative pulse on the new cathode, provided that electrons or ions are able to diffuse this new anode-cathode gap. With the series of cathodes about a common anode, a glow discharge can be made to move in succession along the cathode series by application of successive voltage pulses to each cathode. Thus, the first and second guide cathodes are employed to determine the direction of the glow discharge from main cathode to main cathode. With a glow present on a main cathode, first a negative pulse is applied to the adjacent first guide cathode, then a second negative pulse is applied to the adjacent second cathode, then, upon the termination of the second pulse, because the main cathodes are biased to a potential below the guides, the glow discharge will be transferred to the succeeding main cathode. If the first negative pulse is applied to the adjacent second guide cathode and the second negative pulse is applied to the first guide cathode, then upon termination of the second pulse to the first guide cathode the main glow will be transferred to a preceding main cathode.

Within a beam-switching tube all first guides are connected together and brought out to a first guide terminal. All second guides are connected together and brought out to a second guide terminal. The order of application of a first pulse and a second pulse respectively to the first and second guide output terminals determines whether within a beam-switching tube the count advances or regresses.

In the drawing, the symbol employed for the tubes is that recommended by the manufacturers. Guide 1 input terminal is designated as "G1"; the guide 2 input terminal is designated as "G2". Since any convenient cathode may be selected as the zero-count cathode for the purpose of the reversible counter, in the tube 112 one main cathode is designated as zero and the main cathodes to the right thereof are designated as the +1 through +5 main cathodes. The main cathodes to the left of the zero cathode are designated as the −1 through −4 cathodes. Thus, in the condition at which all command pulses from the signal mixer have been executed, the counter tube 112 will be in the state at which current flows between the anode 114 of the tube and the zero main cathode. The cathode at which a glow exists is at a potential of roughly +40 volts. The other cathodes are at approximately ground potential. In response to a command pulse from the signal mixer, the driving circuit 110 will apply a pulse first to the G1 and then to the G2 input terminals. This will cause the glow to move from the zero main cathode to the +1 main cathode. As a result, a 40-volt potential is applied across the +1 cathode. A potential will also exist across the voltage divider ladder which includes resistors 121, 122, 123, and 124. The tapoff from this resistance ladder is taken at the +5 main cathode. It is applied through a resistor 125 to resistor 61, shown in Figure 2. It will be appreciated that as the count of the reversible counter increases in a positive direction, the potential applied to the voltage ladder, including resistors 121 through 124 moves closer to the tapoff point and therefore increases in value with an increase in the count. Effectively, therefore, the digital count condition of the counter has been converted into an analog voltage representative thereof, which can then be applied to the amplifier 62 for subsequent driving of the servomotor 67 in response thereto.

The output of the motion transducer 34, which is connected to the broach bar, is applied from the signal mixer 57 through the driving circuit 110 in a manner to cause the reversible counter to subtract. This is done by reversing the application of pulses so that the pulse is applied to the G2 terminal before it is applied to the G1 terminal. It will be noted that another resistance ladder 131, 132, 133 is employed which provides as an output at the tapoff point on the −4 main cathode a voltage, the amplitude of which represents the negative count condition of the counter tube 112. It will be appreciated that although this analog voltage represents a negative count condition, it has a positive value. Accordingly, it is inverted by means of an amplifier inverter 136 and is then applied through a resistor 138 to resistor 61, to be added to the voltages from the tachometer and motion transducer.

The driving circuit 110 may include two one-shot multivibrators, the outputs from which may be connected to activate the guide terminals G1, G2, in order G1, G2 for advancing the count and in order G2, G1 for decreasing the count. It should be appreciated that the reversible counter and digital-to-analog converter indicated is by way of example and should not be considered as a restriction upon the invention, since to those skilled in the art there are many other variations of digital-to-analog converters and reversible counters which are perfectly suitable for the purpose described in place of the one shown.

There has accordingly been described and shown herein a novel, useful, and relatively inexpensive system than has heretofore been employed for automatically controlling the rifling of the barrel of a gun. The system is extremely flexible and permits many different types of helices to be cut within the same gun barrell without changing any of the apparatus employed. By virtue of the control instructions being stored in the storage medium, accuracy either in mass production or in production of the same gun barrel at different times and in different places is assured. The necessity for cutting a helix on a broach bar and for storing broach bars with different helices is eliminated.

I claim:

1. A control system for a gun barrel rifling machine of the type wherein a broach is rotated while being moved linearly through a gun barrel comprising means for moving said broach linearly, means for rotating said broach through an arc, first means for generating a pulse for every increment of said linear motion, second means for generating a pulse for every increment of said arc motion, means for deriving from the output of said first means a predetermined number of pulses representative of an increment length of broach arc travel desired per length of linear motion corresponding to said predetermined number of pulses, means to which output of said second means and said means for deriving is applied to provide an output representative of the difference in number of said pulses, and means to apply output from said last named means to provide a difference output to said means for rotating said broach to rotate said broach an increment of arc for each single count in said output.

2. A control system for a gun barrel rifling machine of the type wherein a broach is rotated while being moved linearly through a gun barrel comprising a first transducer for providing a pulse for every increment of linear motion of said broach, counter means for counting the output of said first transducer, means for selecting desired counts of said counter and obtaining an output pulse when said desired count occurs, a second transducer for providing a pulse for every increment of arc motion of said broach, means for subtracting the number of pulses provided by said second transducer from the number of pulses provided by said means for selecting desired counts, and means responsive to output from said means for subtracting for rotating said broach an increment of arc for each single pulse count in said output.

3. A control system for a gun barrel rifling machine of the type wherein a broach is rotated through a predetermined number of increments of an arc while being moved in linear increments through a gun barrel comprising means for storing in succession a plurality of numbers each representative of the number of increments of arc per successive increment of linear motion, a first transducer for providing a predetermined number of pulses for each increment of linear motion of said broach, a counter for counting the output of said first transducer, means for selecting each of said plurality of numbers in succession responsive to said counter counting said predetermined number of pulses for each linear motion increment, means for deriving a pulse output from said counter each time it counts a selected number, a second transducer for providing a pulse for every increment of arc motion of said broach, means for subtracting the number of pulses from said second transducer from the number of pulses received from said means for deriving pulse output from said counter, and means responsive to output from said means for subtracting for rotating said broach an increment of arc for each single pulse count in said output.

4. A control system as recited in claim 3 wherein said means responsive to output from said means for subtracting for rotating said broach an increment of arc for each single pulse count in said output includes a digital-to-analog converter to which output from said means for subtracting is applied, amplifying means connected to said digital-to-analog converter, and an actuator electrically coupled to receive said amplifying means output and mechanically coupled to rotate said broach.

5. A control system for a gun barrel rifling machine of the type wherein a broach is moved linearly through a gun barrel while being rotated comprising means for storing in succession a first plurality of numbers and a second plurality of numbers representing the amount of rotation of said broach desired for a predetermined linear movement represented by an associated second number, a first transducer for providing a pulse for each increment of linear motion of said broach, a counter for counting the output of said first transducer, means for selecting a succeeding first and associated second number responsive to said counter counting an amount equal to a previous second number, means for deriving a pulse output from said counter each time it counts an amount equal to selected first number, a second transducer for providing a pulse for every increment of arc motion of said broach, means for subtracting the number of pulses from said second transducer from the number of pulses from said means for deriving output from said counter, and means responsive to output from said means for subtracting for rotating said broach an increment of arc for each single pulse count in said output.

6. In a control system as recited in claim 5 wherein said storage medium is an elongated storage medium and includes a plurality of adjacent reading heads positioned over said recording medium, said means for selecting includes a register for receiving the numbers read by said reading heads, and means for advancing said recording medium to bring a succeeding first and second number under said reading heads responsive to said counter counting an amount equal to a second number.

7. In a control system as recited in claim 5 wherein said storage medium is an elongated storage medium and includes a plurality of adjacent reading heads positioned over said recording medium, said means for selecting includes a first and second register and means for alternately entering into said first and second registers first and second numbers read from said medium by said reading heads, means for alternately controlling said counter output with the contents of said first and second registers, and means for advancing said recording medium to bring a succeeding first and second number under said reading heads responsive to said counter counting an amount equal to a previous second number.

References Cited in the file of this patent

UNITED STATES PATENTS

| | | |
|---|---|---|
| 2,043,596 | Rovick | June 9, 1936 |
| 2,169,159 | Moller | Aug. 8, 1939 |
| 2,315,476 | Groene | Mar. 30, 1943 |
| 2,517,104 | Gotberg | Aug. 1, 1950 |
| 2,573,800 | Mallinckrodt | Nov. 6, 1951 |
| 2,710,934 | Senn | June 14, 1955 |
| 2,748,665 | Senn | June 5, 1956 |

FOREIGN PATENTS

| | | |
|---|---|---|
| 921,791 | Germany | Dec. 30, 1954 |

OTHER REFERENCES

"A Numerically Controlled Milling Machine," Servomechanisms Laboratory, Massachusetts Institute of Technology, Cambridge 39, Mass. 1951.